US005731843A

United States Patent [19]

Cappels, Sr.

[11] Patent Number: 5,731,843

[45] Date of Patent: Mar. 24, 1998

[54] APPARATUS AND METHOD FOR AUTOMATICALLY ADJUSTING FREQUENCY AND PHASE OF PIXEL SAMPLING IN A VIDEO DISPLAY

[75] Inventor: Richard D. Cappels, Sr., San Jose, Calif.

[73] Assignee: Apple Computer, Inc., Cupertino, Calif.

[21] Appl. No.: 315,906

[22] Filed: Sep. 30, 1994

[51] Int. Cl.[6] .................. H04N 5/04

[52] U.S. Cl. .................. 348/537; 348/536

[58] Field of Search .................. 348/537, 536, 348/538, 539, 540, 572, 573, 574; 375/355, 359, 360, 362, 364, 371, 373; 235/454

[56] References Cited

U.S. PATENT DOCUMENTS

| | | | |
|---|---|---|---|
| 3,848,083 | 11/1974 | Townsend | 358/412 |
| 4,160,998 | 7/1979 | Kamin | 358/105 |
| 4,757,264 | 7/1988 | Lee et al. | 348/537 |
| 4,943,857 | 7/1990 | Izuno et al. | 348/537 |
| 5,360,968 | 11/1994 | Scott | 235/454 |
| 5,396,295 | 3/1995 | Furuta | 348/537 |
| 5,400,367 | 3/1995 | Meylemen et al. | 348/537 |

FOREIGN PATENT DOCUMENTS

| | | | |
|---|---|---|---|
| 0615222 | 9/1994 | European Pat. Off. | G09G 5/12 |
| 6180556 | 6/1994 | Japan | G09G 3/20 |

*Primary Examiner*—David E. Harvey
*Attorney, Agent, or Firm*—Carr & Ferrell, LLP

[57] ABSTRACT

An apparatus and method are provided for automatically adjusting a pixel sampling clock frequency and phase of a video display to match the frequency and phase of a pixel clock used to generate an incoming video signal being received by the video display. Voltage transitions are detected between pixel intensities in a video signal. The voltage transitions are compared with pixel sampling clock pulse signals of the video display in order to correctly match the frequency and phase of the video signal, and thus produce a more stable and noise-free image on the video display.

14 Claims, 5 Drawing Sheets

APPARATUS AND METHOD FOR AUTOMATICALLY ADJUSTING FREQUENCY AND PHASE OF PIXEL SAMPLING IN A VIDEO DISPLAY

FIELD OF THE INVENTION

The present invention relates generally to synchronizing a pixel sampling clock in a video display with a video input signal in order to produce a stable and noise-free signal, and more particularly, to an apparatus and method for automatically adjusting the pixel sampling clock so as to eliminate conventional manual adjustment requirements.

BACKGROUND OF THE INVENTION

In order to produce a clear, noise-free image on a fixed-matrix display receiving a digitally-generated video signal, such as a liquid crystal display (LCD) or a video projector utilizing an LCD spatial light modulator, sampling of the incoming video signal by the display device must occur at the same frequency and a specific phase with respect to the pixel generation clock used to generate the video signal. Moreover, conventional interfaces between video input signals and video displays do not contain separate discrete sampling clock signals. Instead, prior art fixed-matrix video displays generate a sampling clock as a multiple of an available horizontal line synchronization signal by utilizing a phase-locked-loop. The horizontal synchronization pulse, often called the H. Sync pulse, is a signal used in television and display systems to signal the end of a row of pixels, or in television terms, signal the end of a television line.

Edges formed by a transition in voltage levels of the horizontal synchronization pulse are not either instantaneous or well defined with respect to the frequency and phase of the pixel clock signal used to generate the video signal, thus affecting the ability to produce an accurate pixel sampling clock signal for the video display. Accordingly, the user of such a video display must manually adjust the frequency and phase of the pixel sampling clock of the video display to match the frequency and phase of the video input signal in order to produce an image that is stable and noise-free. This manual adjustment is an annoying nuisance to the video display user. More importantly, however, if multiple video sources are being used, manual adjustment requirements become a severe inefficiency problem resulting in decreased productivity. Furthermore, when manual adjustment is necessary on a display device used in presentations, such as with a video projector, it is distracting to the audience. Accordingly, it would be desirable to provide a device for automatically adjusting the frequency and phase of a pixel sampling clock signal in a video display to match the frequency and phase of incoming video signals. Such a device would automatically eliminate noise on a display screen due to sampling frequency and phase mis-matching, and also eliminate the need for any manual frequency and phase adjustment.

SUMMARY OF THE INVENTION

In view of the foregoing deficiencies of prior art video displays, the present invention provides an apparatus and method for automatically adjusting the pixel sampling clock frequency and phase to match the frequency and phase of the pixel clock used to generate an incoming video signal.

The present invention provides an apparatus and method for detecting voltage transitions between pixel intensities in a video signal. The voltage transitions are compared with pixel sampling clock pulse signals of the video display in order to correctly match the frequency and phase of the video signal and the pixel sampling clock to produce a more stable and noise-free image on the video display.

The present invention includes a differentiator, a threshold detector, a phase comparator, a processor, a memory, and a phase adjuster. A video signal is received and processed by the differentiator to produce a voltage pulse in response to voltage transitions. The output signal of the differentiator is applied to the threshold detector which generates a pulse signal if the applied voltage pulse exceeds a predetermined threshold voltage. Voltage pulses exceeding the predetermined threshold voltage are interpreted to be transitions between pixels in the video signal. Each pulse signal from the threshold detector is applied to the phase comparator that outputs a hit flag to the processor if the phase comparator detects a pixel sampling clock signal in proximity to the leading edge of the pulse signal from the threshold detector.

This voltage transition (or edge detection) process is repeated a designated number of times for a specific phase setting of the pixel sampling clock. The processor stores in memory the number of times (hits) where transitions between pixel instructions and pixel sampling clock pulse signals occur temporally proximate to one-another for that specific phase. The processor then varies the phase of the pixel sampling clock via the phase adjuster and repeats the process.

The hit detection process is repeated for various phases over 360°. By determining which phase generates a maximum number of hits for a given number of pixel edges (transitions between pixel intensities in the video signal), the processor can determine the phase of the sampling clock with respect to the horizontal synchronization pulse that will provide optimum sampling of the incoming video signal. Then, the processor adjusts the phase of the pixel sampling clock to match the phase of the video signal.

Failure to detect a single, distinct, optimum setting for the sampling phase indicates that either the pixel sampling frequency is not the same as the pixel clock used in the generation of the video signal or that there is excessive phase or amplitude noise present in the incoming video and synchronization signals.

If a single, distinct, optimum setting for sampling phase is not found, a single, distinct, optimum setting for phase is searched for at various pixel clock frequencies until a single, distinct, optimum setting is obtained.

If, after a single, optimum setting of the sampling phase is not found at any available sampling frequency, the present invention signals that there is excessive amplitude or phase noise in the video signals and that automatic adjustment cannot be achieved.

DETAILED DESCRIPTION OF THE PREFERRED EMBODIMENT

Figure 1:
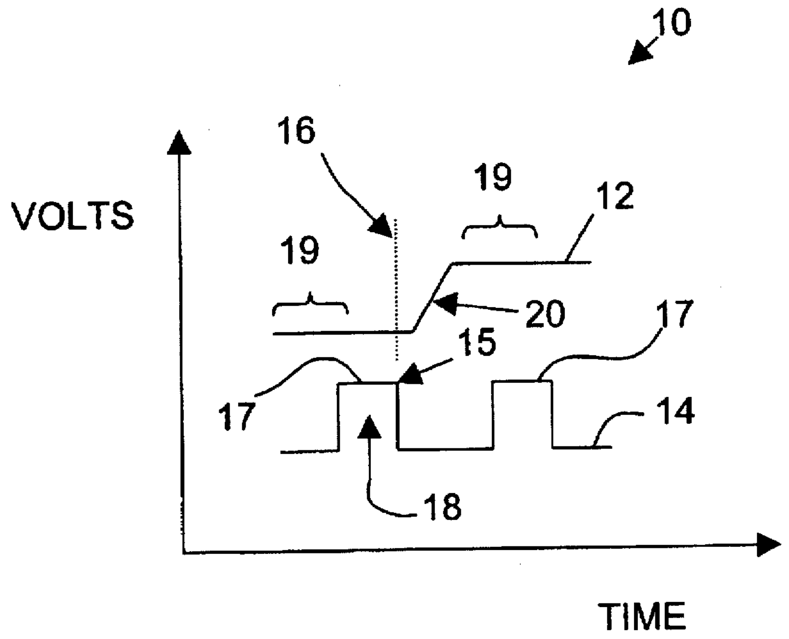
FIG. 1 is a timing diagram illustrating a pixel sampling occurring at a desired location.

Turning now to the drawings and referring first to FIG. 1, a timing diagram is illustrated wherein signal 12 is a conventional computer video signal containing pixel intensities, and signal 14 is a pixel sampling clock signal of a video display receiving the video signal 12. Pulse locations 17 on the pixel sampling clock signal 14 indicate locations where voltage readings are made of the video signal 12. Each pulse location 17 corresponds to a different pixel intensity 19 on the video signal 12.

Voltage transition location 20 occurs between a change in voltage levels and between discrete pixel intensities 19 on video signal 12. Dashed line 16 illustrates a front (active) edge 15 of sampling pulse 18 and the beginning location where a pixel intensity reading is made on video signal 12.

Computer graphic video signals, such as video signal 12 illustrated in FIG. 1, are read out, or "clocked out" of frame buffers at regular time intervals, one pixel at a time. When video signals are displayed on a fixed-matrix display, such as a desk-top LCD display or a video projector display utilizing LCD spatial light modulators, analog voltage values of signal 12 are sampled at pulse locations 17 of the pixel sampling clock signal 14. The voltage value is assigned a display intensity for a discrete pixel location. With conventional fixed-matrix displays, the entire portion of the display area is assigned to a given pixel that reflects the sampled value associated with that pixel. As a result, variations in the sampled voltage values of the video signal 12 can result in pixel intensity variations corresponding to the sampled voltage value 19 of the video signal 12.

In the situation illustrated in FIG. 1, the sampling pulse 18 instructs a sampling, or reading, of the voltage value corresponding to a pixel display intensity of video signal 12 at a sufficient time distance before the video signal 12 makes a voltage change at transition location 20. A sampling situation, as illustrated in FIG. 1, provides very stable operation because the voltage level at point 16 is stable and not changing.

Figure 2:
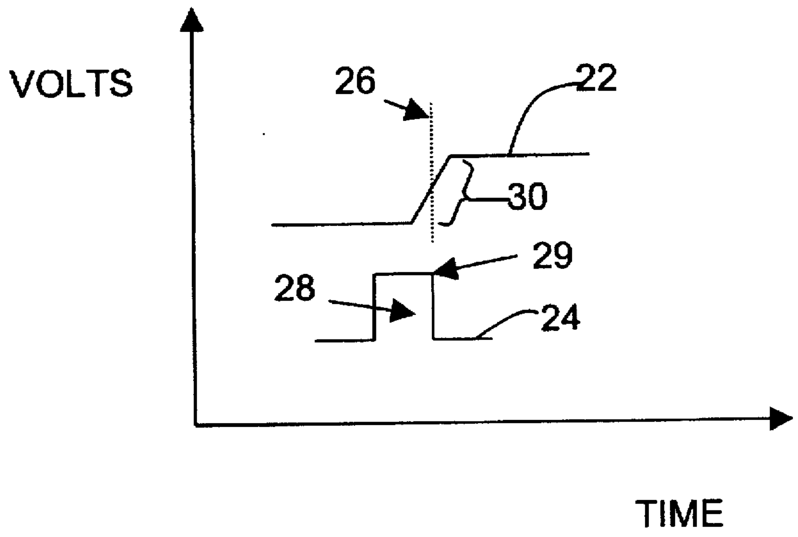
FIG. 2 is a timing diagram illustrating a pixel sampling occurring at an undesired location.

Referring now to FIG. 2, a sampling situation is displayed wherein the resulting reading is not necessarily stable. Similar to FIG. 1, FIG. 2 illustrates a video signal 22 and a pixel sampling clock signal 24. A specific sampling pulse 28 is illustrated wherein the front edge 29 of the sampling pulse 28, a location indicated by dashed line 26, begins measurement of the voltage of the video signal 22 at transition location 30. Since the front edge 29 of the sampling pulse 28 occurs at the transition location 30 of the video signal 22, slight variations in relative phase of the sampling clock pulse 24 and the input video signal 22 will result in an undesired variation of the voltage reading of the sampled voltage value at location 26. If the sampling pulse 28 occurs at a slightly later time with respect to the input video signal 22, the sampled voltage at point 26 will be higher. Similarly, if the sampling pulse 28 occurs at a slightly earlier time with respect to the input video signal 22, the sampled voltage at point 26 will be lower.

The result is an undesired variation in voltage readings and corresponding displayed pixel intensities. An extreme example of this problem can be observed on some video displays while displaying a pattern on a desktop computer in which spatially-adjacent pixels alternate between full-amplitude white and black, and the sampling phase is mis-adjusted. The value of individual pixel voltage readings flicker between a minimum and maximum voltage luminance due to jitter and the relative phase of the pixel sampling clock as compared to the video signal. ("Jitter" refers to temporal instability of the phase of the signal with respect to a pure continuous sine wave.) However, referring back to FIG. 1, since the sampling pulse 18 does not end near a pixel transition, such as the transition location 20, small relative jitter or timing differences will not affect the sampled voltage reading of the video signal 12.

In accordance with the present invention, an apparatus and method are provided for automatically adjusting the frequency and phase of a pixel video display sampling clock to match the frequency and phase of a video signal being applied to the video display. In conventional digitally generated video signals, transitions in voltage levels occur at regular intervals. Since there is typically a large transition between two adjacent pixel voltage level values in an incoming video signal, there exists an increased opportunity for detecting instability in the sampled value if the sampling phase is not well positioned with respect to the voltage transition.

The present invention utilizes the occurrence of the voltage transitions in the video signal to automatically adjust the pixel sampling clock signal of the video display. Since the transitions have a fixed relationship to the pixel clock sending the video signal, the present invention adjusts the phase of the receiving pixel sampling clock with respect to the incoming horizontal synchronization signal. The present invention compares the active edges of sampling pulses in the pixel sampling clock signal with voltage transitions between pixel instructions in the incoming video signal in order to determine a matching frequency and phase.

Figure 3:
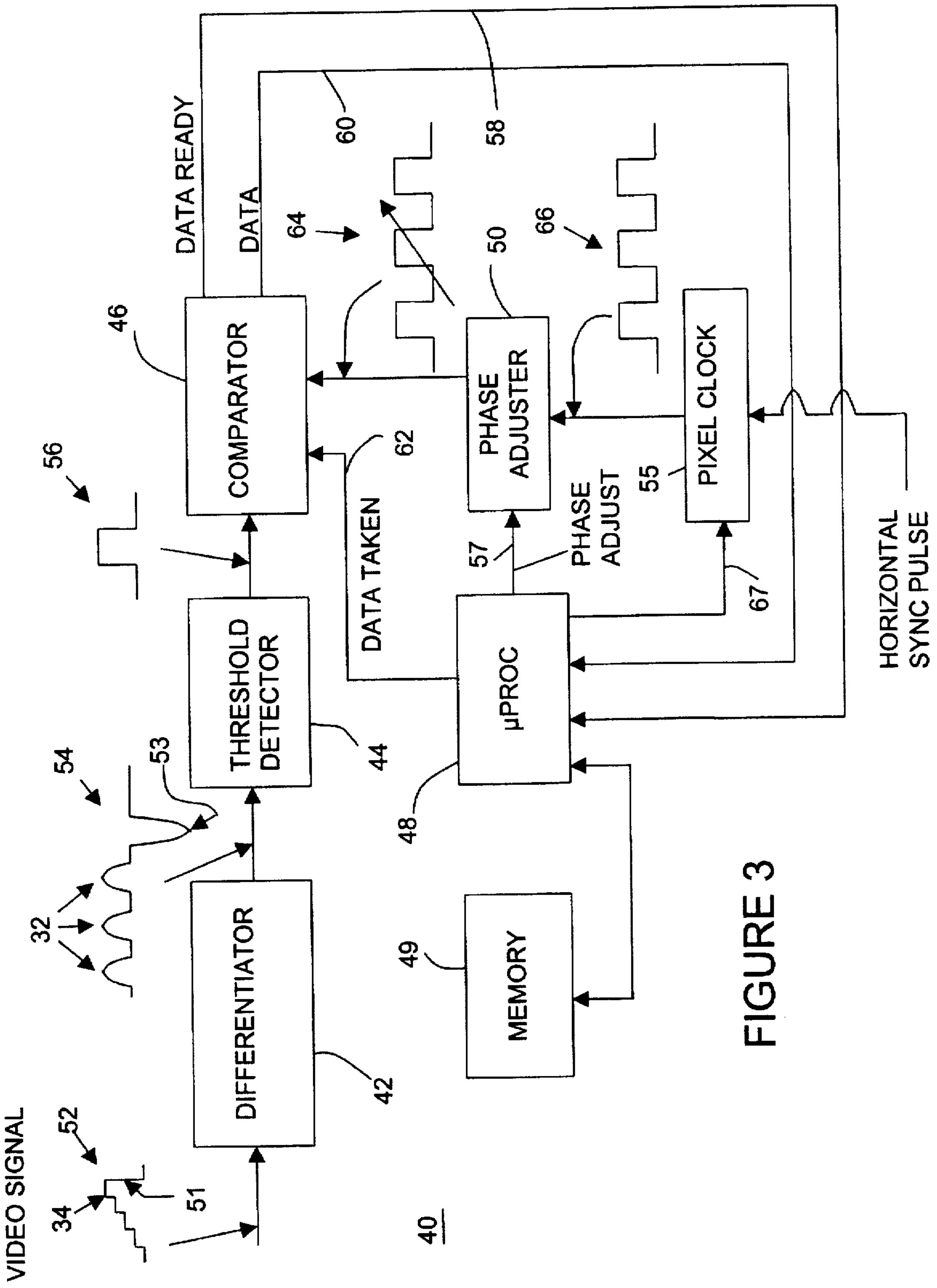
FIG. 3 is a block diagram illustrating elements of the preferred embodiment of the present invention.

FIG. 3 illustrates a block diagram of an electrical circuit 40 configured in accordance with a preferred embodiment of the present invention. The circuit 40 includes a differentiator 42, a threshold detector 44, a phase comparator 46, a microprocessor 48, a memory 49, a phase adjuster 50, and a pixel sampling clock 55 (which is a conventional phase-locked loop using a programmable divider and coupled to the horizontal sync pulse). The differentiator 42 and the threshold detector 44 function together to detect voltage transitions between pixel instructions, also called pixel edges (such as transition 20 in FIG. 1) in a video signal 52.

Now the operation of the present invention will be described. First a video signal 52 is applied to the differentiator 42, and the conventional differentiator 52 produces differentiated signal 54. The differentiated signal 54 produces voltage pulses 32,53 in response to voltage transitions 34,51 in the video signal 52. The differentiated signal 54 is applied to the threshold detector 44. The threshold detector 44 is set to produce an output pulse 56 in response to an applied, differentiated signal 54 having a minimum designated amplitude or threshold voltage pulse. For example, illustrated differentiated signal 54 has a peak 53 that is a voltage pulse of sufficient amplitude to trigger the threshold detector 44 to output a pulse 56. The output pulse 56 is applied to the phase comparator 46.

A non-adjusted pixel sampling clock signal 66 is inputted to the phase adjuster 50, and then adjusted pixel sampling clock signal 64 is inputted to the phase comparator 46. Whenever a pulse 56 is outputted from the threshold detector 44, the phase comparator circuit 46 sets the data ready line flag 58 true to signal the microprocessor 48 that a video transition 53 has been detected, and sets the value on data line 60 to true if the pulse 56 is temporally proximate to the adjusted pixel sampling clock signal 64, indicating a "hit", otherwise the value on data line 60 is set to false to indicate that a "hit" did not occur. The microprocessor 48 then reads the data line 60 and stores the value of the data line 60 in memory 49. The microprocessor 48 then signals the comparator 46 via Data Taken line 62 that the data has been read.

The comparator 46 is reset to await the next edge detection. This process in repeated multiple times for a designated phase and resulting data is stored in the memory 49. The microprocessor 48 stores in memory 49 a number representing the total hits (that is, where transitions between pixel instructions and active edges of sampling pulses of the adjusted pixel sample clock signal 64 occur in close temporal proximity) for that specific phase.

The hit detection process is repeated for various phases over 360°. By determining which phase obtains a maximum number of hits, the microprocessor 48 can determine the phase of the sampling clock with respect to the horizontal synchronization pulse that will provide optimum sampling of the incoming video signal 52. Then, the microprocessor 48 adjusts the phase of the pixel sampling clock 55 via the phase adjuster 50 to produce an adjusted pixel sampling clock signal 64 that matches the phase of the video signal 52. The procedure for determining the correct phase after collecting the hit data will be discussed below in more detail below with respect to FIG. 4.

Figure 4:
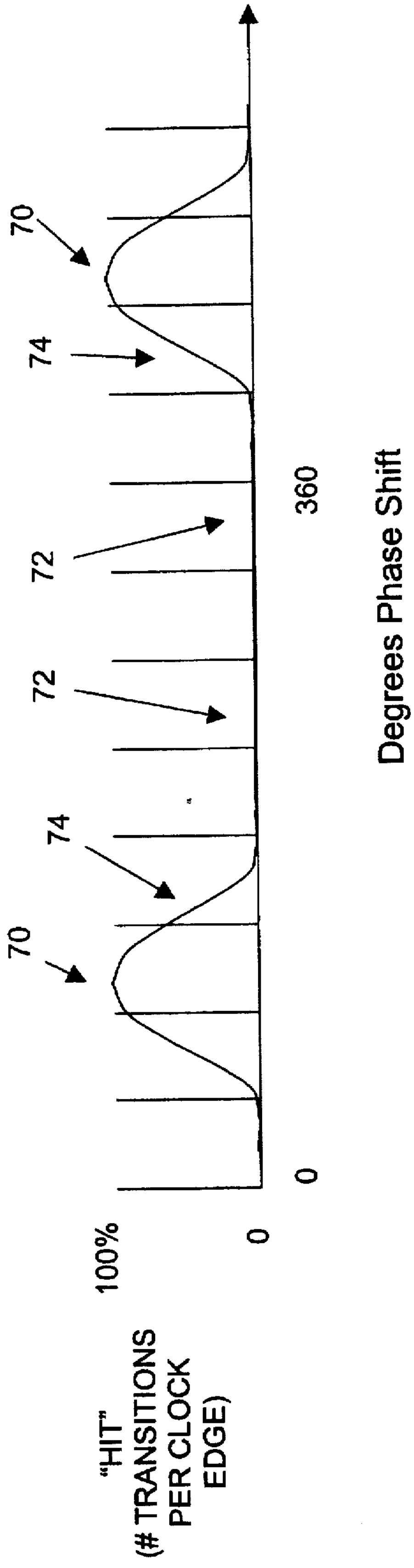
FIG. 4 is a phase diagram illustrating the probability of finding a hit, based on a gaussian distribution of temporal instability of the phase of a video signal with respect to a sine wave.

FIG. 4 is a line graph illustrating the number of hits corresponding to varying degrees of phase shift of the adjusted pixel clock sampling signal 64. As discussed above in reference to FIG. 3, the edge detection process of the present invention is repeated multiple times for various phase settings. Using hit data accumulated in memory 49, the microprocessor 48 calculates a hit percentage for each varied phase. The hit percentage is the number of hits for a given number of video edges (voltage transitions between pixel intensities in the video signal) at a given phase. The resulting calculations can be illustrated, as shown in FIG. 4.

When the pixel clock phase is set for maximum hit rate, the percentage of hits should be 100%, as shown at locations 70 in FIG. 4. At another setting of the phase adjuster 50, the hit rate should equal 0%, as illustrated at locations 72. At some other phase settings, intermediate values are observed, as illustrated at locations 74. Intermediate values are possible because of jitter in the pixel sampling clock 55 relative to the incoming video signal 52. Going through a range of available phase settings, a profile showing a hit rate as a function of phase adjustments (phase shifts) can be generated, as illustrated in FIG. 4.

Once a profile is known, a calculation can be made, based on the relationship between the phase adjustment corresponding to a mid-point of a region with minimum hit rate and a phase pixel clock-to-video transition phase required for stable presentation on an LCD in order to determine the appropriate setting for the phase adjustment of the video pixel sampling clock.

The calculation procedure can be characterized as a subtraction of phase difference. For example, it is known that an LCD needs a sampling clock set 45° in advance of whatever a data plot, or histogram, shows as the optimum phase setting, such as illustrated in FIG. 4. Therefore, if a minimum number of hits is found with a phase setting of 72 at 90°, then the invention adds 45° to 90° to arrive at an optimum setting for the pixel sampling clock of 135°.

If varying the phase fails to produce a satisfactorily low value for a hit rate, that is, where one phase setting should at least produce a zero hit rate (as shown at locations 72), such a result would indicate that the frequency of the adjusted pixel sampling clock signal 64 is incorrect for the incoming video 52, or that there is excessive noise present in the video signal 52.

If a single, distinct, optimum setting for sampling phase is not found, a single, distinct, optimum setting for phase is searched by the microprocessor 48 using line 67 to vary the pixel clock frequencies via the pixel clock 55 until a single, distinct, optimum setting is obtained.

If a setting of a correct sampling phase is not found at any available sampling frequency, the present invention signals that there is excessive amplitude or phase noise in the video signals and that automatic adjustment cannot be achieved.

If the lack of a low hit rate is not due to excessive noise, then it is likely that there is a beat between a pixel sampling clock in the video source and the pixel sampling clock 55 in the video display. A beat, applying a heterodyne process, is produced by nonlinear mixing of two or more signals of different frequencies. The beat is the sum and difference of the two frequencies. For instance, if a video signal is clocked out of a frame buffer at 30 MHz and the pixel sampling clock is set to 30.1 MHz, the output of the sampling circuit would contain signals at 60.1 MHz, 30 MHz, 30.1 MHz and 0.1 MHz The signals would be displayed on a histogram showing the percentage of hits as more than one peak in 360°.

Once this condition is sensed, the microprocessor 48 varies the pixels/line ratio in combination with a range of phase control settings to determine the lowest hit rate obtainable and to find the proper phase for the adjusted pixel sampling clock signal 64.

Figure 5:
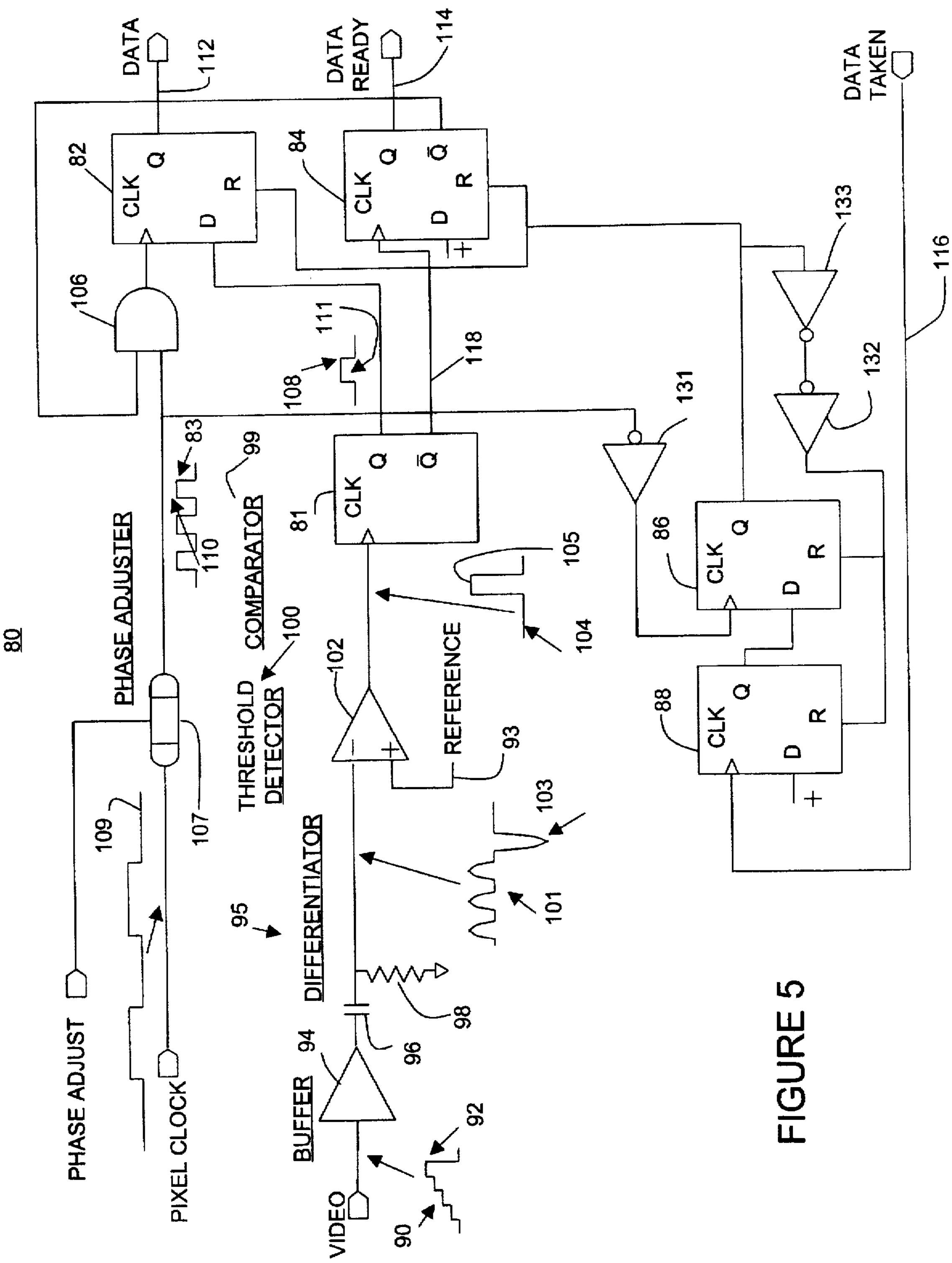
FIG. 5 is a schematic of a circuit incorporating the preferred embodiment of the present invention.
Figure 6:
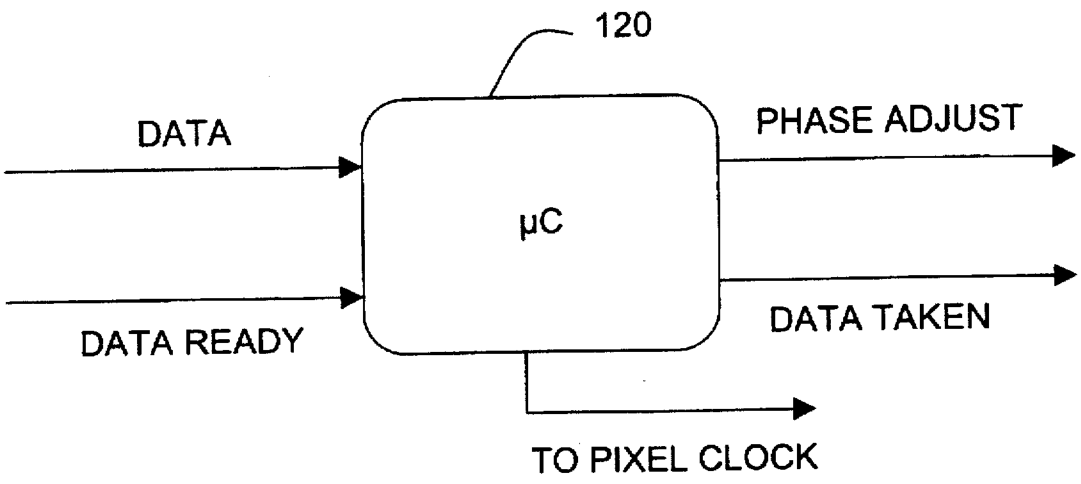
FIG. 6 is an input/output diagram for a processor included in the circuit of FIG. 5.

FIG. 5 illustrates a circuit 80 constructed in accordance with the block diagram in FIG. 3. Circuit 80 detects voltage transitions 92 (that is, pixel instruction edges) in a video signal 90 and compares the transitions 92 to the active edges 83 of the adjusted pixel sampling clock signal 110.

Operation of the circuit 80 begins with Q outputs of latches 81,82,84,86, and 88 reset to a low state. The video signal 90 having a voltage transition edge 92 (pixel instruction edge) is first applied to a buffer 94. After being processed by buffer 94, the video signal 90 is applied to differentiator 95. In the illustrated embodiment, the differentiator 95 includes a capacitor 96 and a resistor 98, however, in another embodiment the differentiator 95 could include means for comparing an input and output of a delay line or capacitively coupling to the input of a high-gained inverting amplifier. A differentiated signal is a signal wherein instantaneous amplitude of the differentiated signal corresponds to the rate of change of the video signal, and thus represents a transition between pixel voltage values.

The differentiated signal 101 is applied to threshold detector 100 that produces a pulse signal 104 in response to a voltage peak 103 of sufficient amplitude to meet a predetermined voltage reference value which corresponds to a pixel instruction edge. In the illustrated embodiment the threshold detector 100 includes a voltage comparator 102 and a reference voltage 93.

The pulse signal 104 is inputted to a comparator 99. The comparator 99 includes a one-shot pulse generator 81 and a latch 82. The pulse signal 105 is applied to the trigger input of one-shot pulse generator 81, thus setting the Q output to a high signal 108 for a predetermined period of time, that is inputted to the D input of latch 82. The pixel sampling clock signal 109 passes through the phase adjuster 107 to produce adjusted pixel sampling clock signal 110. The adjusted pixel sampling clock signal 110 is inputted to the clock input of latch 82 via AND gate 106. If the leading edge of adjusted pixel sampling clock signal 64 from AND gate 106 occurs while the Q-output pulse 108 from the one-shot pulse generator 81 is true, data line 112 is set high, indicating that a "hit", a sampling edge in close temporal proximity to a video transition, has taken place. If the Q-output of one-shot pulse generator 81 was low when the last leading edge of adjusted pixel sampling clock signal 64 from AND gate 106 occurs, data line 112 is set low. The width of the pulse from one-shot pulse generator 81 must be greater than or equal to the minimum change in the setting of phase adjuster 107 in order to be certain of the pulse being detected by at least one setting of phase adjuster 107.

At the end of a pulse signal on the NOT-Q output 118 of one-shot pulse generator 81, Data Ready line 114 is set true to indicate to microprocessor 120 that a video edge has been detected. The NOT-Q output from Latch 84 disables the output of AND Gate 106 to disable further triggering of latch 82, thus preserving the state of the latch 82, and the comparator 99, until the microprocessor 120 indicates that it has read data 112 by momentarily setting data taken line 116 true.

After the Data Taken signal 116 is processed by latch 86 and latch 88, latch 82 is reset and the circuit 80 is ready to compare the location of another transition 92 with the phase of the adjusted pixel sampling clock signal 110. The inverters 131,132,133 and latches 88,86 produce a pulse that resets the latches 82,84 between active edges of the adjusted pixel sampling clock 110 so that the circuit 80 can go ahead and check the relative phase of the next video transition with the next adjusted pixel sampling clock 110 after the edge of the data taken signal 116, even though the microprocessor 120 has not yet removed the data taken signal from the Data taken line 116. In this manner the signal from Data taken line 116 is re-synchronized with the pixel sampling clock so that the exact timing of the microprocessor 48 does not affect the result of the measurement.

While the invention has been described in connection with a preferred embodiment, there is no intent to limit the invention to that embodiment. On the contrary, the intent is to cover all alternatives, modifications and equivalents included within the spirit and scope of the invention as defined by the appended claims.

I claim as my invention:

1. A circuit for automatically adjusting frequency and phase of a pixel sampling signal in a video display, the circuit comprising:

a transition detector for generating first signals identifying voltage transitions in a video signal;

a threshold detector coupled to the transition detector for generating second signals identifying the first signals having values exceeding a predetermined threshold that correspond to a pixel edge in the video signal; and a comparator, having a pixel sampling signal input and coupled to the threshold detector, for generating a hit signal in response to the second signals occurring during a sampling pulse of a pixel sampling signal.

2. The circuit of claim 1, further comprising:

a counter coupled to the comparator for determining a number of hits.

3. The circuit of claim 2, further comprising:

a phase adjuster for adjusting a phase of the pixel sampling signal received by the comparator, the phase adjuster having an input for a pixel sampling signal and being coupled to the counter and the comparator, and the phase adjuster being under control of the counter.

4. The circuit of claim 3, wherein the counter further determines the number of hits for a given number of pixel edges at a given phase inputted to the comparator by the phase adjuster.

5. The circuit of claim 4, wherein the counter, via the phase adjuster, varies the phase of the pixel sampling signal inputted to the comparator and determines the number of hits for each phase.

6. The circuit of claim 5, wherein the counter includes a processor for calculating a number of hits for a given number of pixel edges at each of the varied phases.

7. The circuit of claim 6, wherein the processor creates a profile having a hit rate as a function of phase variations.

8. The circuit of claim 7, wherein the processor, based on data in the profile which indicate a relationship between phase variations and hit rates, determines an appropriate setting of the phase adjuster to correspond to a phase of the video signal.

9. The circuit of claim 6, further comprising:

a memory coupled to the processor for storing data.

10. The circuit of claim 1, wherein the comparator includes a one-shot pulse generator having an output coupled to a D-latch.

11. The circuit of claim 1, wherein the voltage transitions occur between pixel intensities.

12. The circuit of claim 1, wherein the transition detector includes a differentiator.

13. The circuit of claim 1, wherein the threshold detector includes a voltage comparator coupled to a reference voltage.

14. The circuit of claim 8, further comprising:

a pixel sampling clock having a horizontal synchronization input and coupled to the phase adjuster and the processor, and the processor varies the pixel sampling frequency inputted to the phase adjuster to allow an optimum phase setting.

* * * * *